US008041374B2

(12) United States Patent
Miwa et al.

(10) Patent No.: US 8,041,374 B2
(45) Date of Patent: Oct. 18, 2011

(54) APPLICATION EXECUTION METHOD, FILE DATA DOWNLOAD METHOD, FILE DATA UPLOAD METHOD, COMMUNICATION METHOD, NETWORK IDENTIFIER SETTING METHOD AND WIRELESS COMMUNICATION TERMINAL

(75) Inventors: Yasutaka Miwa, Tokyo (JP); Kenjiro Komaki, Saitama (JP); Tetsuo Watanabe, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 682 days.

(21) Appl. No.: 11/256,686

(22) Filed: Oct. 20, 2005

(65) Prior Publication Data

US 2006/0068702 A1    Mar. 30, 2006

Related U.S. Application Data

(63) Continuation of application No. PCT/JP2005/007326, filed on Apr. 15, 2005.

(30) Foreign Application Priority Data

May 7, 2004    (JP) ................................. 2004-139180

(51) Int. Cl.
*H04B 7/24*    (2006.01)
*H04B 7/00*    (2006.01)
(52) U.S. Cl. .......................... 455/507; 455/41.2; 455/39
(58) Field of Classification Search .................... 455/39, 455/41.2, 507, 525
See application file for complete search history.

(56) References Cited

U.S. PATENT DOCUMENTS

| 6,950,655 B2* | 9/2005 | Hunkeler ................. 455/426.1 |
| 7,330,696 B2* | 2/2008 | Orlassino et al. ............ 455/41.2 |
| 2004/0082383 A1 | 4/2004 | Muncaster et al. |
| 2004/0157557 A1* | 8/2004 | Barnett et al. ............... 455/41.2 |
| 2004/0185881 A1* | 9/2004 | Lee et al. ....................... 455/466 |
| 2006/0234631 A1* | 10/2006 | Dieguez ....................... 455/41.2 |
| 2008/0194201 A1* | 8/2008 | Sinivaara et al. ............ 455/41.2 |

FOREIGN PATENT DOCUMENTS

| JP | 2001-053901 | 2/2001 |
| JP | 2002-224449 | 8/2002 |
| JP | 2002-281048 | 9/2002 |
| JP | 2003-101553 | 4/2003 |
| JP | 2003-304252 | 10/2003 |
| JP | 2004-096146 | 3/2004 |
| WO | 2004/032536 | 4/2004 |

OTHER PUBLICATIONS

Notification of Reason(s) for Refusal from the corresponding Korean Application dated Mar. 26, 2007. Notification of Reason(s) for Refusal for corresponding Japanese Application 2004-139180, dated Jul. 5, 2005 with translation.
The translation of International Preliminary Report on Patentability and Written Opinion of the International Searching Authority mailed Nov. 23, 2006.
Notice of Reason(s) for Refusal dated Jul. 14, 2009, from corresponding Japanese Application JP 2005-214350.
Supplementary European Search Report dated Aug. 31, 2011, from corresponding European Application No. 05 73 0645.

* cited by examiner

*Primary Examiner* — Andrew Wendell
(74) *Attorney, Agent, or Firm* — Katten Muchin Rosenman LLP

(57) ABSTRACT

A game device is provided with an SSID setting unit and a channel setting unit. The SSID setting unit sets up an SSID (a network identifier) in accordance with a communication mode. Communication modes include a download standby mode, a download mode, a lobby mode and a game mode. By setting up an SSID for each communication mode, wireless networks for respective modes are formed. The channel setting unit sets up a communication channel in accordance with the SSID.

3 Claims, 12 Drawing Sheets

|  | NICKNAME |
|---|---|
| GAME DEVICE 2b | Joe |
| GAME DEVICE 2c | Mike |

|  | ICON | APPLICATION NAME | NICKNAME |
|---|---|---|---|
| GAME DEVICE 2b | ★ | TITLE A | Joe |
| GAME DEVICE 2c | ♪ | TITLE B | Mike |

|  | ICON | APPLICATION NAME | NICKNAME |
|---|---|---|---|
| GAME DEVICE 2b | ★ | TITLE A | Joe |
| GAME DEVICE 2c | ♪ | TITLE B | Mike |

APPLICATION EXECUTION METHOD, FILE DATA DOWNLOAD METHOD, FILE DATA UPLOAD METHOD, COMMUNICATION METHOD, NETWORK IDENTIFIER SETTING METHOD AND WIRELESS COMMUNICATION TERMINAL

CROSS-REFERENCE TO RELATED APPLICATION

This application is a continuation of International Application PCT/JP05/007326 filed on Apr. 15, 2005, pending at the time of filing of this continuation application and claims priority from Japanese Patent Application 2004-139180 filed on May 7, 2004, the contents of which are herein wholly incorporated by reference.

BACKGROUND OF THE INVENTION

1. Field of the Invention

The present invention relates to a technology for communicating between a plurality of communication terminals and, more particularly, to a technology of efficiently executing an application in a wireless network.

2. Description of the Related Art

With the realization of miniaturization and lightweight of information terminals, it has become common for people to carry an information terminal. Wireless communication environment in which a plurality of users can enjoy an application such as a game together using infrastructure such as base stations and access points has become a reality in recent years. Study has also been undertaken on the construction of wireless ad hoc network for on-demand communication. In an ad hoc network, base stations and access points are not necessary. It is therefore easy to build a wireless network even in places where no such infrastructure exists. In an ad hoc network, a plurality of users can enjoy a game together as they join each other, bringing their own portable game devices and communicating wirelessly.

An infrastructure network and an ad hoc network are built using technologies such as IEEE802.11 or Bluetooth. A wireless communication environment assumed conventionally is such that several terminals are brought together so that communication is achieved between the terminals. In an infrastructure network or an ad hoc network, however, a situation could occur in which as many as 10-100 terminals are brought together in the same environment.

In a wireless network using IEEE802.11, a Basic Service Set (BSS) is prescribed as a basic unit of group comprising terminals communicating with each other. BSS refers to a set which is a group of mutually communicating terminals. Terminals belonging to the same BSS can communicate with each other. A BSS is identified by a 48-bit identifier known as Basic Service Set ID (BSSID). A unique value in the environment is assigned to a BSSID. There is also available a Service Set ID (SSID) comprised of a character string of 0-32 bytes to discriminate between BSSs. SSID may be arbitrary set up. The same SSID may be assigned to a plurality of BSSs. A BSS is formed by a terminal or an access point transmitting a reference packet called beacon. The range reached by the beacon defines a spatial range of the BSS. A plurality of BSSs may be located in the same physical space.

When using a wireless network using IEEE802.11, a terminal is required to belong to one of the BSSs available. For this purpose, the terminal searches for (scans) BSSs located in its neighborhood. When participating in an existing group, the terminal may specify an SSID in case it has the knowledge of the SSID of a group in which participation is sought. In contrast, if the SSID is not known, the terminal scans all BSSs in its neighborhood and specifies an SSID selected from the SSIDs identified as a result of the search.

In a wireless LAN system of the infrastructure mode using access points, an access point transmits a beacon so as to form a BSS. In a majority of cases, an access point is connected to the Internet or a private network such as an enterprise network. Normally, a manager of such a network determines an SSID and sets up an access point accordingly. Uses of the network are informed of the SSID from the network manager and are involved in wireless communication accordingly.

In a wireless LAN system of an ad hoc mode not using access points, a network manager is not available. Therefore, users of the network have to determine an SSID themselves for connection. In this case, mutual connection is impossible unless the terminals select the same SSID. Therefore, it is necessary for the users to agree upon an SSID prior to communication. Since an SSID can be arbitrarily set up, connection may be established to an undesired wireless network if the same SSID is used in different groups. Thus, the setting of an SSID in an ad hoc network is a complicated process for users to perform. Further, stability in communication is difficult to achieve in an environment in which a large number of wireless networks are built in the same environment.

SUMMARY OF THE INVENTION

Accordingly, the present invention relates to a technology of efficiently executing an application by efficiently setting up a network identifier such as an SSID.

In one embodiment of the present invention, an application execution method comprises: connecting to a first wireless network in which to search for an entity with which to execute an application jointly; searching for a wireless communication terminal already connected to the first wireless network; requesting the wireless communication terminal from which terminal information is received as a result of a search to execute the application jointly; connecting to a second wireless network in which to execute the application if a reply indicating acceptance is received from the entity; and starting the application in the second wireless network.

In another embodiment of the present invention, a file data download method comprises: connecting to a first wireless network in which to search for an entity from which to download file data; searching for a wireless communication terminal already connected to the first wireless network; requesting the file data to be downloaded from the wireless communication terminal from which terminal information is received as a result of a search; connecting to a second wireless network in which to download the file data if a reply indicating acceptance is received from the entity; and downloading the file data from the entity in the second wireless network.

In still another embodiment of the present invention, an application execution method comprises: connecting to a first wireless network in which to search for a first entity from which to download an application program; searching for a wireless communication terminal already connected to the first wireless network; requesting the application program to be downloaded from the wireless communication terminal from which terminal information is received as a result of a search; connecting to a second wireless network in which to download the application program if a reply indicating acceptance is received from the first entity; downloading the application program from the first entity in the second wireless network; starting the downloaded application program and connecting to a third wireless network in which to search for a second entity with which to execute the application jointly, when the application program has been downloaded; searching for a wireless communication terminal already connected to the third wireless network; requesting the wireless communication terminal from which terminal information is received as a result of a search to execute the application jointly; connecting to a fourth wireless network in which to execute the application if a reply indicating acceptance is received from the second entity; and starting the application in the fourth wireless network.

In yet another embodiment of the present invention a wireless communication terminal comprises: a network identifier setting unit which sets up an identifier for identifying a wireless network; and a wireless interface unit which connects to a wireless network by referring to the network identifier thus set up. The network identifier setting unit sets up an identifier for identifying a first wireless network in which to search for an entity from which to download an application program, an identifier for identifying a second wireless network in which to download the application program, an identifier for identifying a third wireless network in which to search for an entity with which to execute the application jointly, or an identifier for identifying a fourth wireless network in which to execute the application, depending on a communication mode.

In another embodiment of the present invention, a communication method comprises: connecting to a first wireless network; searching for a wireless communication terminal already connected to the first wireless network; requesting the wireless communication terminal from which terminal information is received as a result of a search to communicate on an individual basis; and connecting to a second wireless network if a reply indicating acceptance is received from the wireless communication terminal.

In yet another embodiment of the present invention a file data upload method comprises: connecting to a first wireless network; transmitting a reply indicating acceptance to a file data download request from another wireless communication terminal connected to the first wireless network; connecting to a second wireless network in which to upload the file data; and uploading the file data in the second wireless network. The file data includes a program file and a data file.

In still another embodiment of the present invention, a network identifier setting method comprises: determining whether an identifier for identifying a wireless network is stored in a predetermined area in a memory, when an application program is started; and using the identifier determined to be stored as the identifier of the wireless network to connect to.

Arbitrary combinations of the aforementioned constituting elements and implementations of the invention in the form of methods, apparatuses, systems, recording mediums and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
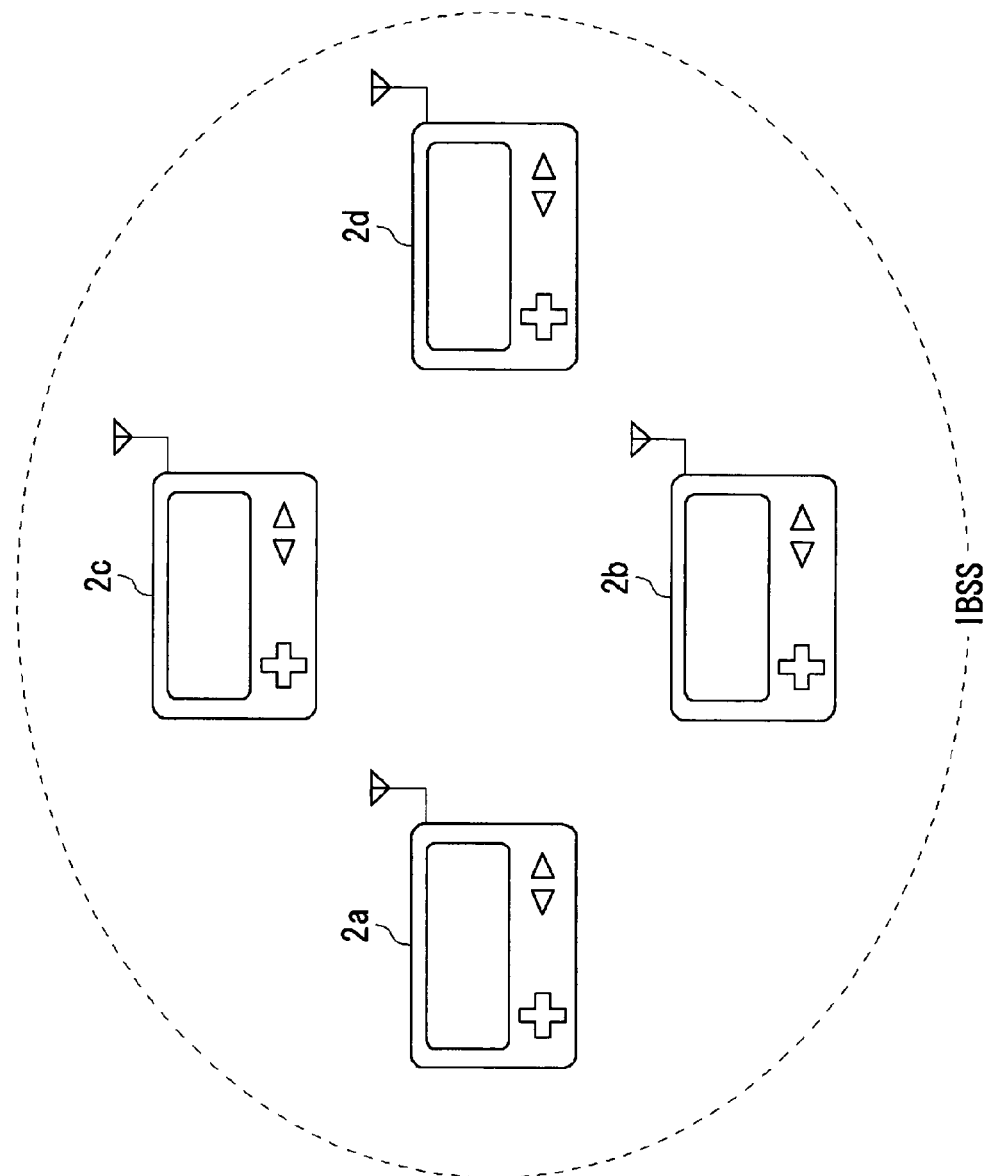
FIG. 1 shows an IBSS in an ad hoc network using IEEE802.11.

FIG. 1 is a schematic illustration of an Independent Basic Service Set (IBSS) in an ad hoc network using IEEE802.11. IBSS corresponds to a wireless network. Stations in the IBSS can directly communicate with each other. In FIG. 1, four game devices 2a, 2b, 2c and 2d are illustrated as examples of wireless communication terminals (stations). The number of game devices 2 constituting the IBSS is not limited to four. Any number of devices other than four may constitute the set. Each of the game devices 2 is provided with a wireless communication function. By bringing a plurality of game devices 2 together, a wireless network is built. A wireless ad hoc network is built by using a wireless LAN standard such as IEEE802.11. In the IBSS, communication between a plurality of game devices 2 is achieved by building an ad hoc network without requiring infrastructure such as base stations and access points. The communication range of IBSS is called a basic service area. The basic service area is determined by the propagation characteristic of a wireless medium.

Example 1

Figure 2:
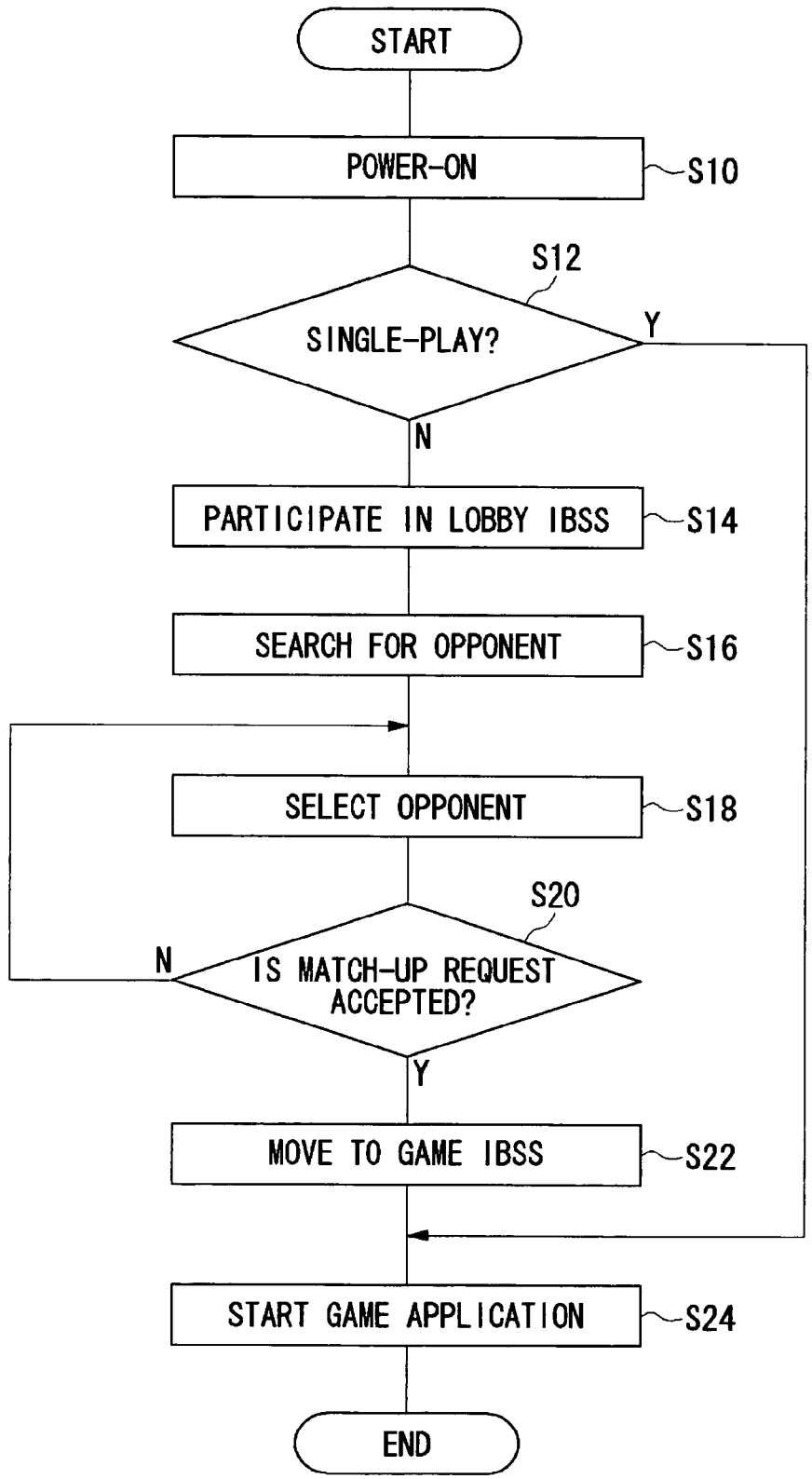
FIG. 2 is a flow chart of steps performed until a player starts a game application according to an illustrative example of the invention.

FIG. 2 is a flowchart of steps performed until a player starts a game application according to the illustrative example of the invention. The flowchart shows a communication method in the game device 2 and, more specifically, a method of executing an application. Initially, the player turns the power of the game device 2 on (S10). It will be assumed that a recording medium storing a game program played is inserted in a media drive of the game device 2. The recording medium may store a program for communication. The program for communication may be stored in a ROM of the game device 2.

When the power is turned on, the game program is read from the recording medium so that the game application is started. The display screen of the monitor of the game device 2 prompts the user to select "a single-player mode" or "a multiple-player mode". "A multiple-player mode" represents a match-up mode of play in, for example, a beat'-em-up game. By selecting the match-up mode, the user can enjoy playing a game with other users over a wireless network. When a single play is selected (Y in S12), the game application is started (S24) so that the player can enjoy a game in a single-player mode.

When a match-up mode is selected (N in S12), the game device 2 participates in, or connects to, a lobby IBSS (S14). In the game system according to this example, a lobby IBSS is a wireless network in which to search for an entity with which to run an application jointly. More specifically, a lobby IBSS plays the role of a lobby room in which the game device 2 searches for another game device or negotiates with another game device for match-up. The SSID of a lobby IBSS (hereinafter, referred to as "lobby SSID") is an identifier for identifying a network. A unique lobby SSID is set up for each game title. By setting up lobby SSID to form lobby IBSSs in a manner dependent on each of individual game titles, only those game devices that play the same game are brought together in a lobby IBSS. By bringing together players playing the same game, players can search for an opponent in a match-up easily. As such, the value of a lobby IBSS will be enhanced.

The lobby SSID may directly be written in a game program. In this case, the game device 2 reads the lobby SSID from the game program and searches for an IBSS having the SSID. With this, it is possible to find a desired lobby IBSS. By acquiring the BSSID of the lobby IBSS, the game device 2 can participate in the lobby IBSS. In comparison with an exhaustive search for lobby IBSSs in the entire neighborhood, time required for a search is reduced and time required for connection is reduced accordingly. Another advantage of this approach is that it is not necessary for users to agree upon an SSID. Therefore, time required for connection is reduced in this respect, too.

The lobby SSID may not be directly written in a game program in order to prevent extra load from being imposed on a producer of the game program. In this case, a lobby ID uniquely assigned to each of individual game titles is written in the game program. The communication program generates an SSID on the basis of the lobby ID. The lobby ID may preferably be defined as a simple character string. A lobby ID may have the role of a game ID specifying a game title. By not requiring attention from the producer of a game program to the SSID and by allowing the communication program to automatically generate an SSID, extra load is prevented from being imposed on the producer of the game program. It will be assumed here that the application of the game title A is started and the unique lobby SSID of the game title A "TITLE_A_MATCHMAKE" is determined.

The game device 2 that participated in the lobby IBSS searches for other game devices already participating in the lobby IBSS (S16). The game devices participating in the lobby IBSS broadcast terminal information packets indicating their status. The terminal information packet includes a mnemonic name (nickname) of the game device. A nickname is set up by a user for each game device. The game device 2 in search for an opponent can have the knowledge of game devices connected to the same wireless network (lobby SSID) and terminal information thereof, by receiving terminal information packets from other game devices. A list generated as a result of the search is displayed on a monitor of the game device 2.

Figures 3A, 3B:
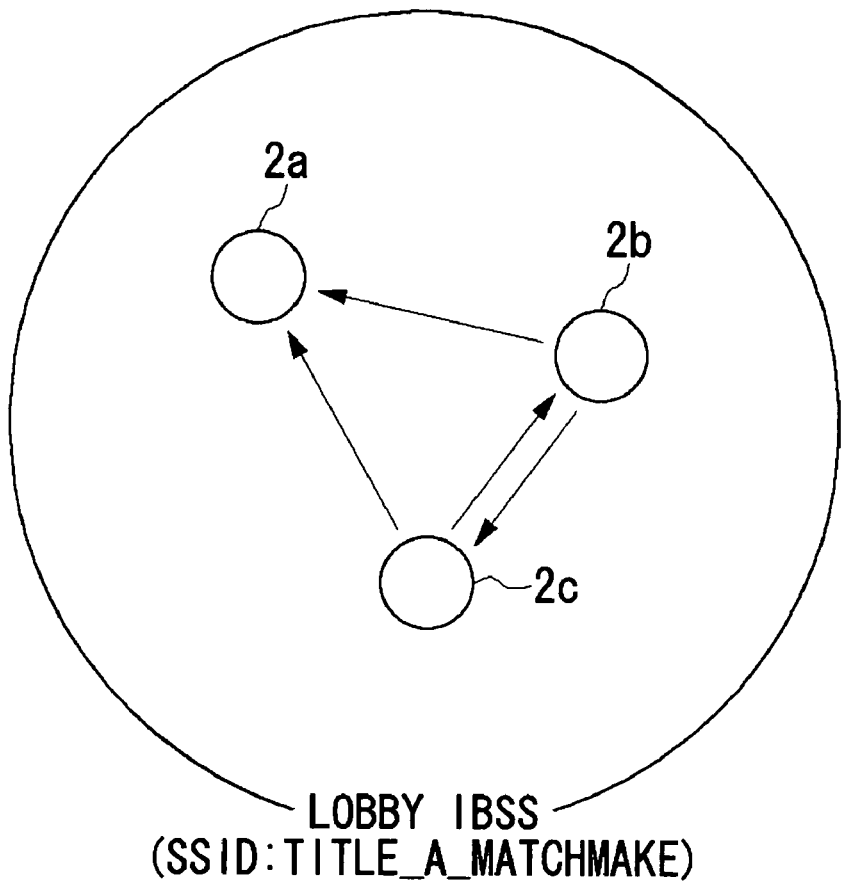
FIG. 3A shows a relation between game devices in a lobby IBSS.
FIG. 3B shows a list of terminal information generated in the game device.

FIG. 3A shows a relation between game devices in a lobby IBSS. The game device 2a is conducting a search and the game devices 2b and 2c are broadcasting terminal information packets. The arrow in FIG. 3A indicates the direction in which the terminal information packet is transmitted. The game device 2a receives the terminal information packets from the game devices 2b and 2c and creates a list of terminal information. For example, a search may be conducted such that the game device 2a transmits a search packet and receives the terminal information packets returned from the game devices 2b and 2c. FIG. 3B shows a list of terminal information generated in the game device 2a. The terminal information list lists game devices in relation to their nicknames.

Figure 4:
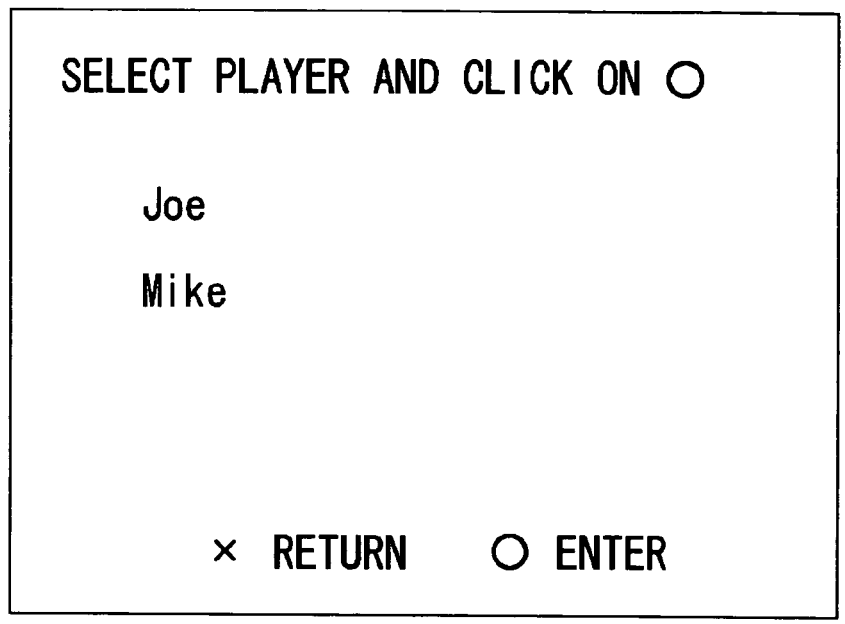
FIG. 4 shows an example of terminal information list being displayed on a monitor of the game device.

FIG. 4 shows an example of the terminal information list thus generated being displayed on the monitor of the game device 2a. The user may operate a button or the like to select a player (nickname) displayed on the monitor. Match-up with a friend may be achieved by knowing the friend's nickname beforehand and selecting that nickname.

Referring to FIG. 2, when the user selects an opponent by operating a button (S18), a match-up request packet is transmitted to the selected opponent. The match-up request packet is a packet for requesting the selected opponent to execute a game application jointly. The match-up request packet includes the nickname of the game device 2a. It will be assumed that the nickname of the game device 2a is "HAL". When the match-up request packet is transmitted from the game device 2a to the game device 2b, the monitor of game device 2b displays the fact that there is a match-up request from the game device 2a along with the nickname of the game device 2a. The user of the game device 2b determines whether to play match-up. Acceptance or rejection is transmitted to the game device 2a in the form of a reply packet. When a match-up request is accepted (Y in S20), the game devices 2a and 2b generate an SSID different from "TITLE_A_MATCHMAKE" and move to the associated wireless network (S22). The destination wireless network is an IBSS in which to play match-up in the game. This IBSS will be referred to as a game IBSS. The IBSS is a wireless network in which the opponents execute an application jointly. When the match-up request is rejected (N in S20), the user of the game device 2a selects another game device (in this case, the game device 2c) as an opponent (S18). A match-up request packet is transmitted to the game device 2c.

The SSID of the game IBSS (hereinafter, referred to as a "game SSID") may be determined based on the terminal information of at least one of the requesting game device and the opponent. More specifically, the game SSID may be determined by referring to the nickname of the game device 2a (HAL) and the nickname of the game device 2b (Joe). By including the nickname of at least one of the opponents in the SSID, a unique SSID can be set up. For example, the game SSID may be "TITLE_A_PLAYING_HAL_JOE". The game devices 2a and 2b starts a game application in the game IBSS (S24) and plays match-up. In this case, the start of a game application means actual match-up play with the opponent.

If the terminal information packet cannot be received from another game device in a search conducted in S16, or if no agreement on match-up is reached in S20, the searching game device may broadcast its terminal information packet to seek an opponent.

Figure 5:
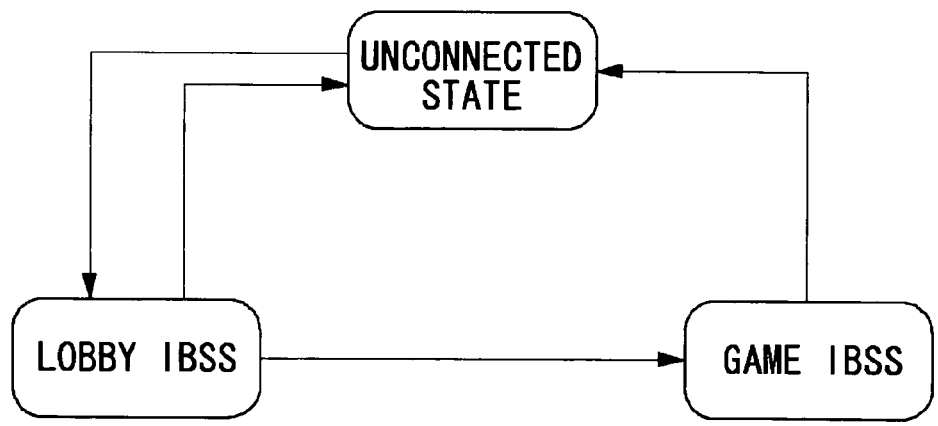
FIG. 5 shows transition between communication modes of the game device.

FIG. 5 shows transition between communication modes of a game device. In the ad hoc network of the example, three communication modes are established, i.e., an unconnected mode in which the game device is not participating in any IBSSs, a lobby mode in which the game device is participating in a lobby IBSS and a game mode in which the game device is participating in a game IBSS. The unconnected mode corresponds to a state occurring immediately after power-on of the game device 2 or a state in which the user plays in a single-player mode.

Each of the game devices 2 in the lobby IBSS receives terminal information packets from other game devices located in the same IBSS or broadcasts its terminal information packet to the other game devices.

If an agreement on match-up with another game device is reached, the game device 2 participating in the lobby IBSS can enter a game IBSS dedicated to a group participating in a match-up. The game IBSS is a group constituted by a plurality of game devices playing the game concurrently and represents an individual wireless network set up for the group. A plurality of game IBSSs may be located in the same environment.

The game device 2 can return from the lobby IBSS or the game IBSS back to the unconnected mode at an arbitrary point of time. When returning from the game IBSS to the lobby IBSS, the game device 2 temporarily makes a transition to the unconnected mode before participating in the lobby IBSS.

When power saving control or control for avoidance of signal collision is executed in the game system according to the example, different modes of control may be applied to the lobby IBSS and to the game IBSS. The lobby IBSS and the game IBSS may differ in requirement for latency, etc. Therefore, efficient communication is achieved by applying different modes of control to individual IBSSs established.

Example 2

In example 1, the SSID of a lobby IBSS is set up for each game application, or for each game title, and the lobby SSID is formed for each game title. Example 2 of the invention enables the use of an SSID of a lobby IBSS that is common to all applications. In this case, the lobby IBSS is formed to be common to a plurality of applications. The flow of steps performed until the user starts a game application is similar to the flow shown in FIG. 2.

Referring to FIG. 2, the player initially turns the power of the game device 2 on (S10). It will be assumed that a recording medium storing a game program of the game title A is inserted in a media drive of the game device 2.

When the power is turned on, the game program is read from the recording medium so that the game application A is started. The display screen of the monitor of the game device 2 prompts the user to select "a single-player mode" or "a multiple-player mode". When a single play is selected (Y in S12), the game application is started (S24) so that the player can enjoy a game in a single-player mode.

When a match-up mode is selected (N in S12), the game device 2 participates in, or connects to, a lobby IBSS (S14). In example 2, the lobby SSID "COMMON_MATCHMAKE" is common to a plurality of applications. The SSID "COMMON_MATCHMAKE" may be recorded in a ROM of all game devices 2 or written in all game programs. With this, time required for a search for lobby IBSSs is reduced and time required for connection is reduced accordingly. Another advantage of this approach is that it is not necessary for users to agree upon an SSID. Therefore, time required for connection is reduced in this respect, too.

The game device 2 that participated in the lobby IBSS searches for other game devices already participating in the lobby IBSS (S16). The game devices participating in the lobby IBSS broadcast terminal information packets indicating their status. A terminal information packet includes an application name, icon data and a mnemonic name (nickname) of the game device. The icon data and nickname are predefined by the user for each game device. The searching game device 2 can have the knowledge of game devices connected to the same wireless network (lobby SSID), application information and terminal information, by receiving terminal information packets from other game devices. A list generated as a result of the search is displayed on the monitor of the game device 2. In example 2, a lobby SSID common to the applications is built. Therefore, the game device 2 can have the knowledge of other game devices seeking an opponent in a game application other than the desired application. For example, if there are no opponents in the desired game application, match-up play can still be enjoyed by switching to another game application in which an opponent is sought.

Figures 6A, 6B:
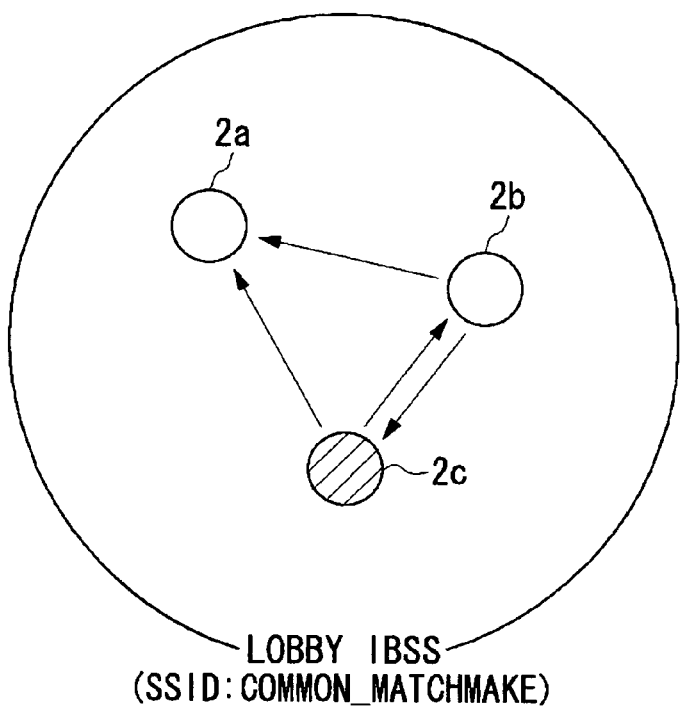
FIG. 6A shows a relation between game devices in a lobby IBSS.
FIG. 6B shows a list of terminal information generated in the game device.

FIG. 6A shows a relation between game devices in a lobby IBSS. The game device 2a is conducting a search and the game devices 2b and 2c are broadcasting terminal information packets. The game device 2b is running a game application A and the game device 2c is running a game application B. The arrow in FIG. 6A indicates the direction in which the terminal information packet is transmitted. The game device 2a receives the terminal information packets from the game devices 2b and 2c and creates a list of the terminal information. For example, a search may be conducted such that the game device 2a transmits a search packet and receives the terminal information packets returned from the game devices 2b and 2c. FIG. 6B shows a list of terminal information generated in the game device 2a. The terminal information list lists game devices, icons, application names and nicknames in relation to each other.

Figure 7:
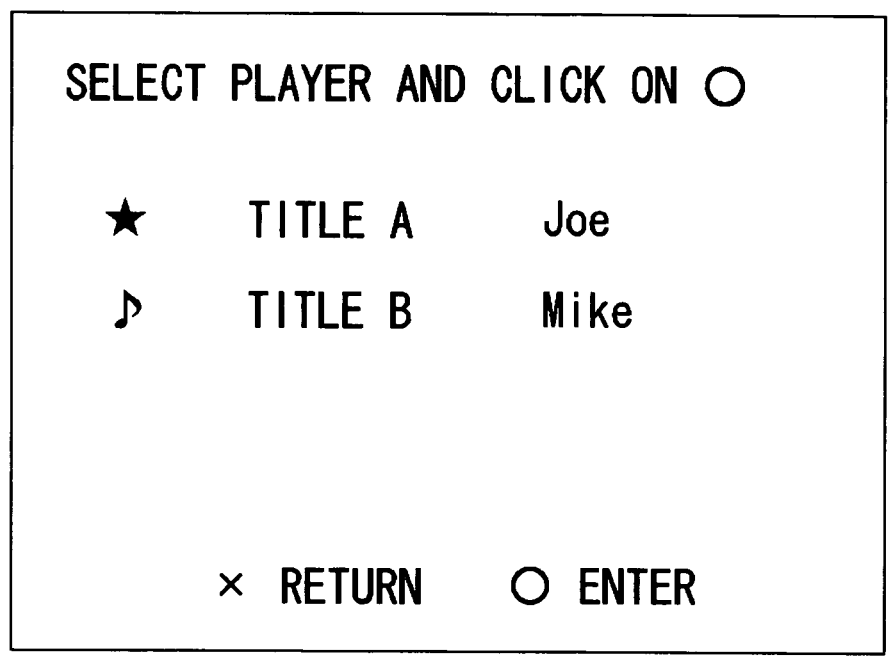
FIG. 7 shows an example of the terminal information list being displayed on the monitor of the game device.

FIG. 7 shows an example of the terminal information list thus generated being displayed on the monitor of the game device 2a. The user may operate a button or the like to select a player displayed on the monitor.

Referring to FIG. 2, when the user selects an opponent by operating a button (S18), a match-up request packet is transmitted to the selected opponent. The match-up request packet includes the application name, the icon data and nickname of the game device 2a. It will be assumed that the nickname of the game device 2a is "HAL". When the match-up request packet is transmitted from the game device 2a to the game device 2b, the monitor of game device 2b displays the fact that there is a match-up request from the game device 2a. There are also displayed the name of the application being run in the game device 2a, along with the icon data and nickname of the game device 2a. The user of the game device 2b determines whether to play match-up by referring to the displayed information. Acceptance or rejection is transmitted to the game device 2a in the form of a reply packet. When the match-up request is accepted (Y in S20), the game devices 2a and 2b generate an SSID different from "COMMON_MATCHMAKE" and move to the associated wireless network (S22). The destination wireless network is a game IBSS in which to play match-up in the game. As described in example 1, the game IBSS is a wireless network in which the game application is executed. The SSID of the game IBSS is generated based on the terminal information of at least one of the game devices 2a and 2b. With this, the game IBSS that is unique in the game system is set up. When the match-up request is rejected (N in S20), the user of the game device 2a selects another game device (S18).

If the game device 2a is provided with the game program of the title B, the game device 2a may terminate the game application A, start the game application B and offer a match-up to the game device 2c. If the terminal information packet cannot be received from another game device in a search conducted in S16, or if no agreement on match-up is reached in S20, the searching game device may broadcast its terminal information packet to seek an opponent.

Example 3

In example 1 and example 2, methods are described in which the game application is started on an assumption that the game device 2 is provided with the game program. In example, it is assumed that the game device 2 is not provided with the game program and a method is described in which the game program is downloaded from another game device in the neighborhood.

Figure 8:
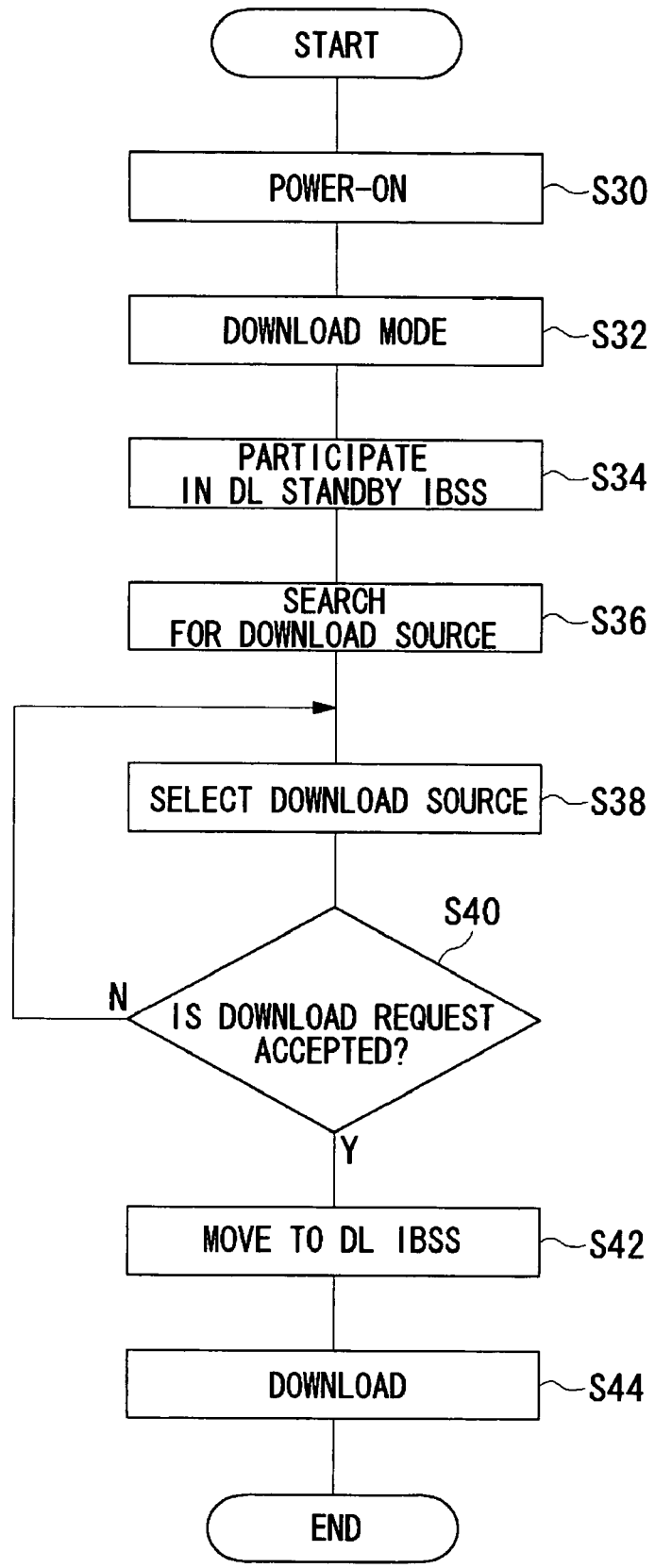
FIG. 8 is a flowchart showing how a player downloads a game program according to an illustrative example of the invention.

FIG. 8 is a flowchart showing how a player downloads a game program according to example 3. Initially, the player turns the power of the game device 2 on (S30). In example 3, a recording medium storing the game program is not inserted in the media drive of the game device 2 so that the game device 2 cannot start the game application. The user selects a download mode for downloading the game program (S32). The ROM of the game device 2 stores a program for downloading. When the download mode is selected, the program for downloading is automatically started so that the game device 2 participates in, or connects to, a DL standby IBSS (S34).

The SSID of the DL standby IBSS is an identifier for identifying a network in which to search for a game device from which to download an application program. For example, the SSID may be "DOWNLOAD_MATCH-MAKE". The SSID "DOWNLOAD_MATCHMAKE" may be stored in the ROM of all game devices 2. With this, time required for a search for the DL standby IBSS is reduced and time required for connection is reduced accordingly.

The game device 2 that participated in the DL standby IBSS searches for other game devices already participating in the DL standby IBSS (S36). In the DL standby IBSS, there may be a game device provided with a downloadable game application and looking for a game device desiring a download, in a search for an opponent for match-up. In many cases, actually, the user of the game device provided with the downloadable application and the user of the game device desiring a download may be friends with each other, and the former user may allow the latter user to download the game program to enjoy the game together.

The game device provided with the downloadable application broadcasts a terminal information packet indicating its status. The terminal information packet includes an application name, icon data and a mnemonic name (nickname) of the game device. The icon data and nickname are predefined by the user for each game device. The searching game device 2 can have the knowledge of game devices connected to the same wireless network (DL standby SSID), information on downloadable application and terminal information, by receiving terminal information packets from other game devices. A list generated as a result of the search is displayed on the monitor of the game device 2.

Figures 9A, 9B:
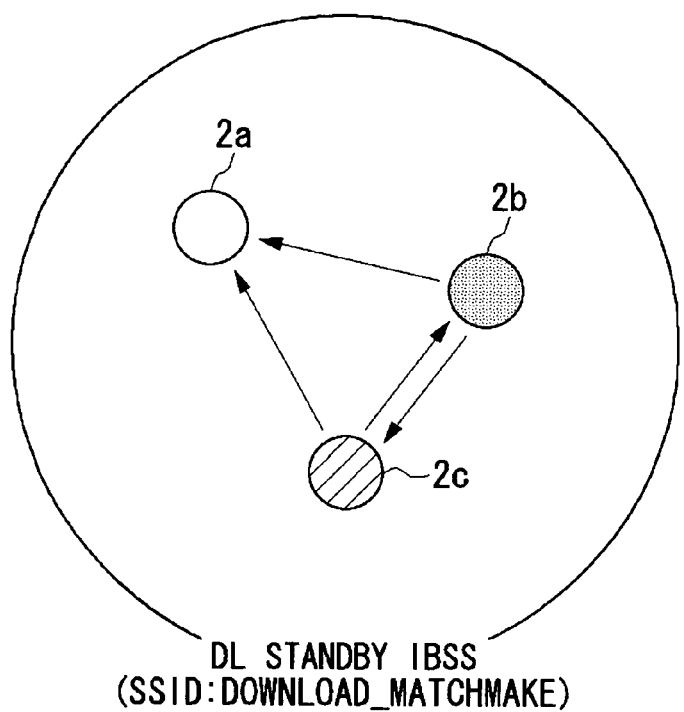
FIG. 9A shows a relation between game devices in a DL standby IBSS.
FIG. 9B shows a list of terminal information generated in the game device.

FIG. 9A shows a relation between game devices in the DL standby IBSS. The game device 2a is conducting a search and the game devices 2b and 2c are broadcasting terminal information packets. The game device 2b is running the game application A and the game device 2c is running the game application B. The arrow in FIG. 9A indicates the direction in which the terminal information packet is transmitted. The game device 2a receives the terminal information packets from the game devices 2b and 2c and creates a list of the terminal information. For example, a search may be conducted such that the game device 2a transmits a search packet and receives the terminal information packets returned from the game devices 2b and 2c. FIG. 9B shows a list of terminal information generated in the game device 2a. The terminal information list lists game devices, icons, names of downloadable applications and nicknames in relation to each other.

Figure 10:
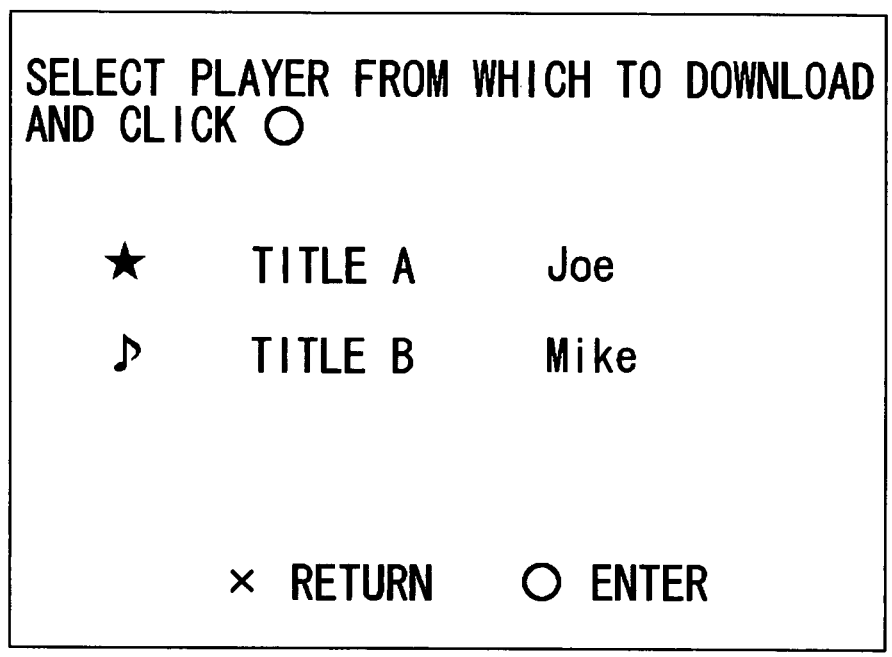
FIG. 10 shows an example of the terminal information list being displayed on the monitor of the game device.

FIG. 10 shows an example of the terminal information list thus generated being displayed on the monitor of the game device 2a. The user may operate a button or the like to select a player displayed on the monitor. The monitor displays the names of the downloadable application programs and the terminal information such as the nicknames in relation to each other.

Referring to FIG. 8, when the user selects a player as a download source by operating a button (S38), a game program transmission request packet is transmitted to the selected device. The transmission request packet is a packet for requesting an application program to be downloaded from a specific game device. The transmission request packet also includes the icon data and nickname of the game device 2a. It will be assumed that the nickname of the game device 2a is "HAL". When the transmission request packet is transmitted from the game device 2a to the game device 2b, the monitor of game device 2b displays the fact that there is a transmission request from the game device 2a. There are also displayed the icon data and nickname of the game device 2a. The user of the game device 2b determines whether or not to transmit the game program by referring to the displayed information. Acceptance or rejection of program transmission is transmitted to the game device 2a in the form of a reply packet. When the request for program transmission is rejected (N in S40), the user of the game device 2a selects another game device (S38).

When the request for program transmission is accepted (Yin S40), the game devices 2a and 2b generate an SSID different from "DOWNLOAD_MATCHMAKE" and move to the associated wireless network (S42) The destination wireless network is an IBSS in which the game program is downloaded. This IBSS will be referred to as a DL IBSS. For example, the SSID of the DL IBSS may be "TITLE_A_PLAYING_HAL_JOE". In the DL IBSS, the game program is transmitted from the game device 2b to the game device 2a (S44). Having downloaded the game program A, the game device 2a starts the game program A so as to play match-up with the game device 2b. In the DL IBSS, not only the game program is downloaded but also the game application can be started between the game devices 2a and 2b.

After downloading the game program A, the game device 2a may play match-up with a game device other than the game device 2b. In is this case, the game device 2a may enter the lobby IBSS of the game application A so as to search for an opponent for match-up. The process performed since the entry into the lobby IBSS and until the start of the game application is as described in example 1 and example 2.

Figure 11:
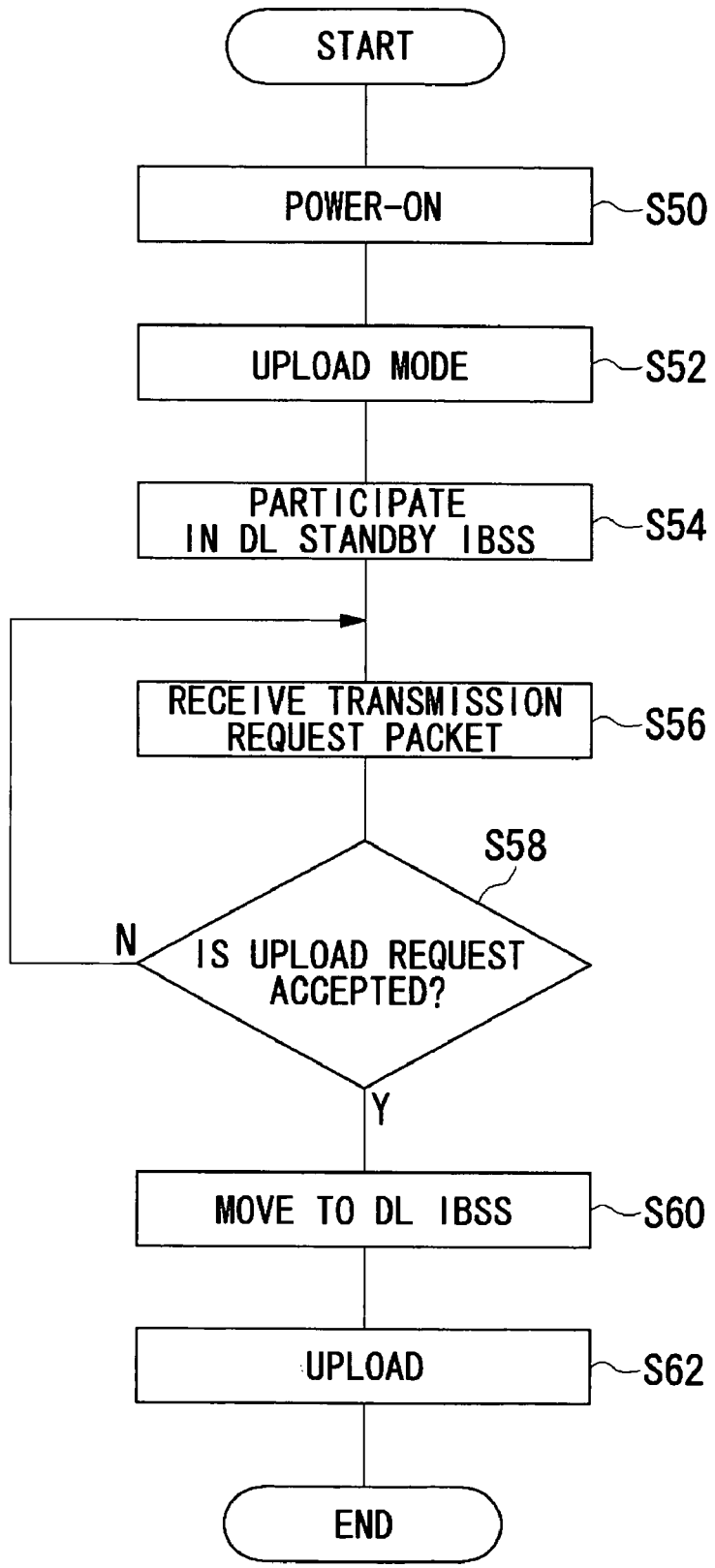
FIG. 11 is a flowchart showing how a player uploads a game program according to an illustrative example of the invention.

FIG. 11 is a flowchart showing how a player uploads a game program according to example 3. Initially, the player turns the power of the game device 2 on (S50). A recording medium storing a game program played is inserted in the media drive of the game device 2. The recording medium may store a program for communication. The program for communication may be stored in the ROM of the game device 2.

When the power is turned on, the game program is read from the recording medium so that the game application is started. The player selects an upload mode for uploading the game program (S52). The upload mode is a mode in which to upload the game program available locally to another game device. In example 3, the upload mode and the download mode are two complementary aspects of the same approach. When the upload mode is selected, the program for uploading is automatically started and the game device 2 participates in, or connects to, the DL standby IBSS (S54). In this case, the player can play a game in a single-player mode.

The game device 2 provided with a downloadable application broadcasts a terminal information packet indicating its status. The terminal information packet includes an application name, icon data and a mnemonic name (nickname) of the game device. The icon data and nickname are predefined by the user for each game device 2. Other game devices 2 in search of a download source can acknowledge that the game device 2 is connected to the same wireless network (DL standby IBSS), by receiving the terminal information packet from the game device 2.

The game device 2 receives, from another game device desiring a download, the transmission request packet requesting transmission of the game program (S56). The user of the game device 2 determines whether to upload the game program. Acceptance or rejection of the request for program transmission is transmitted to the game device desiring a download in the form of a reply packet. When the request for program upload is rejected (N in S58), the game device 2 stands by for a download request from another game device.

When the request for program upload is accepted (Y in S58), the game device 2 moves to the DL IBSS (S60) so as to upload the game program (S62).

Figure 12:
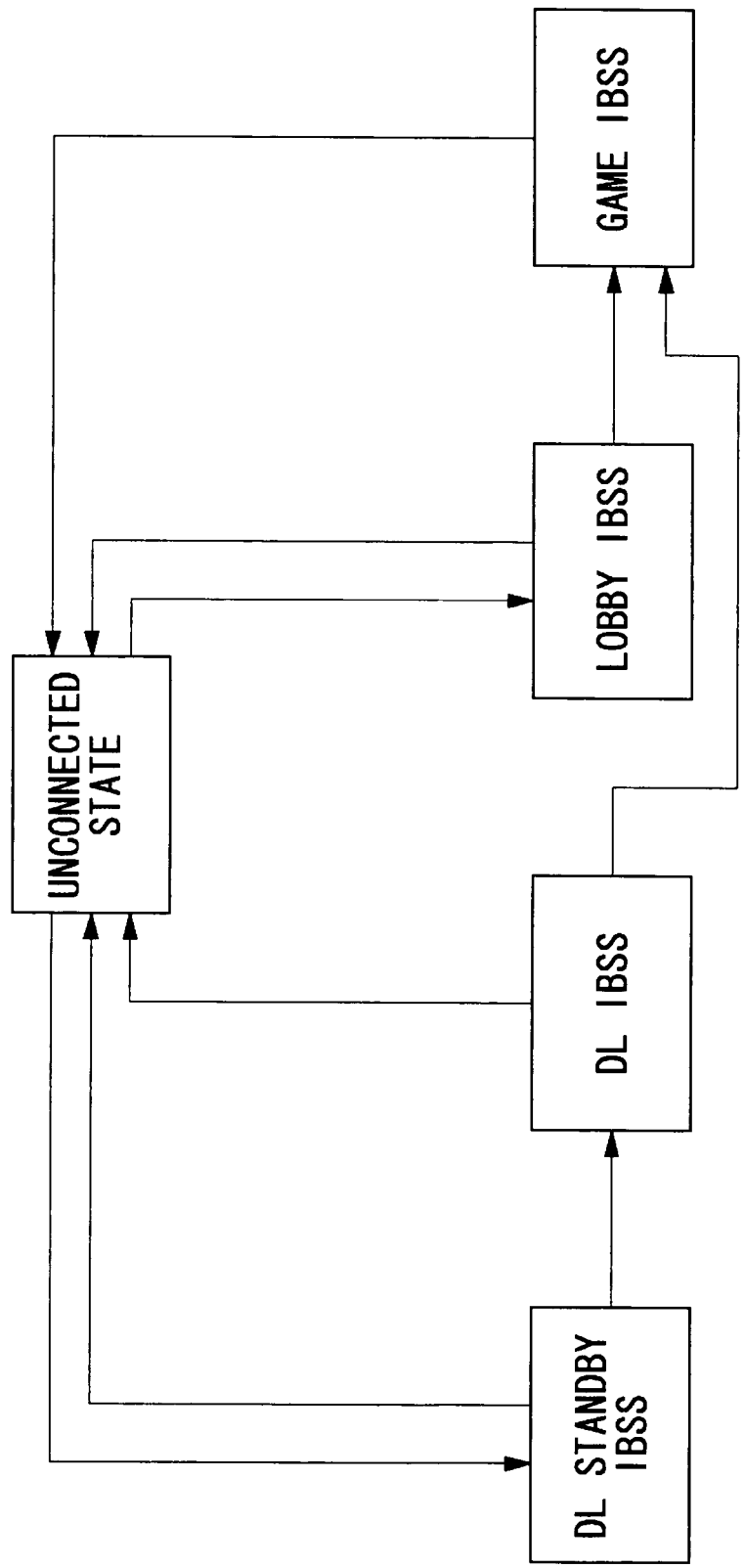
FIG. 12 shows transition between communication modes of a game device according to an illustrative example of the invention.

FIG. 12 shows transition between communication modes of a game device according to example 3. In the ad hoc network of example 3, five communication modes are established, i.e., an unconnected mode in which the game device is not participating in any IBSSs, a download standby mode in which the game device is participating in a DL standby IBSS, a download mode in which the game device is participating in a DL IBSS, a lobby mode in which the game device is participating in a lobby IBSS and a game mode in which the game device is participating in a game IBSS. The unconnected mode corresponds to a state occurring immediately after power-on of the game device 2 or a state in which the user plays in a single-player mode.

In the DL standby IBSS, the game device 2 transmits a request for transmission of a game program to a game device provided with the game program. The game device provided with the game program stands by to transmit the game program. Upon receiving the request for transmission of the game program, the game device standing by determines whether to accept or reject the transmission request.

The game device 2 participating in the DL standby IBSS can enter the DL IBSS in which to execute a download when another game device determines to transmit the game program. In the DL IBSS, the game program is downloaded. After downloading, the game device 2 starts the game program downloaded and temporarily returns to the unconnected state. In this process, a determination may be made between the downloading game device and the uploading game device as to whether to execute the game application together after downloading the game application.

If it is determined that the game application is to be executed together, the downloading game device and the uploading game device collaborate to set up an SSID used to run the game application jointly. The downloading game device 2 may store the SSID thus set up in a predetermined area in the memory before starting the game program. The memory may be a flash memory in which data is not lost as a result of restarting the game device 2. The game device 2 refers to the predetermined area in the memory after starting the game program and examines whether the SSID set up is stored. When the SSID is stored, the game device 2 enters an IBSS identified by the SSID. Simultaneously, the uploading game device also enters the IBSS identified by the SSID set up. The uploading game device may enter the IBSS identified by the SSID set up, immediately after the upload is completed. The IBSS corresponds to the game IBSS.

The uploading game device and the downloading game device may play match-up in the DL IBSS. In this case, the game device 2 may return to the DL IBSS after starting the downloaded game program. When the game application is not run together, the game device 2 may enter the lobby IBSS of the game. When restarted, the game device 2 refers to the predetermined area in the memory. When the SSID setup is not stored, the game device 2 enters the lobby IBSS in accordance with the player's input for operation.

In the lobby IBSS, the game device 2 receives a terminal information packet from another game device located in the same IBSS or broadcast its terminal information packet to other game devices.

When an agreement on match-up is reached with another game device, the game device 2 participating in the lobby IBSS may enter the game IBSS dedicated to a match-up group. The game IBSS is a group constituted by a plurality of game devices playing the game at the same time and represents an individual wireless network set up for the group. A plurality of game IBSSs may be located in the same environment. The game device 2 participating in the lobby IBSS may download file data from or upload file data to another game device. The game device 2 and the other game device may alternatively enter a new IBSS for download or upload. Download or upload of file data such as a program file or a data file may be executed regardless of whether a recording medium storing a game program is inserted in the game device 2.

By forming an IBSSs for each communication mode by changing SSIDs depending on the communication modes, the value of wireless networks is enhanced. As already mentioned, it is possible to play match-up in the DL IBSS. It is also possible to directly move from the DL IBSS to the game IBSS, bypassing the lobby IBSS. The game device can return from the DL standby IBSS, the DL IBSS, the lobby IBSS or the game IBSS back to the unconnected state at an arbitrary point of time. When returning from the DL IBSS to the DL standby IBSS or when returning from the game IBSS to the lobby IBSS, the game device needs to temporarily enter the unconnected mode. As described in example 2, the game device 2 may enter a lobby IBSS common to a plurality of game applications and enter the DL IBSS when one of the opponents is not provided with a game program.

Figure 13:
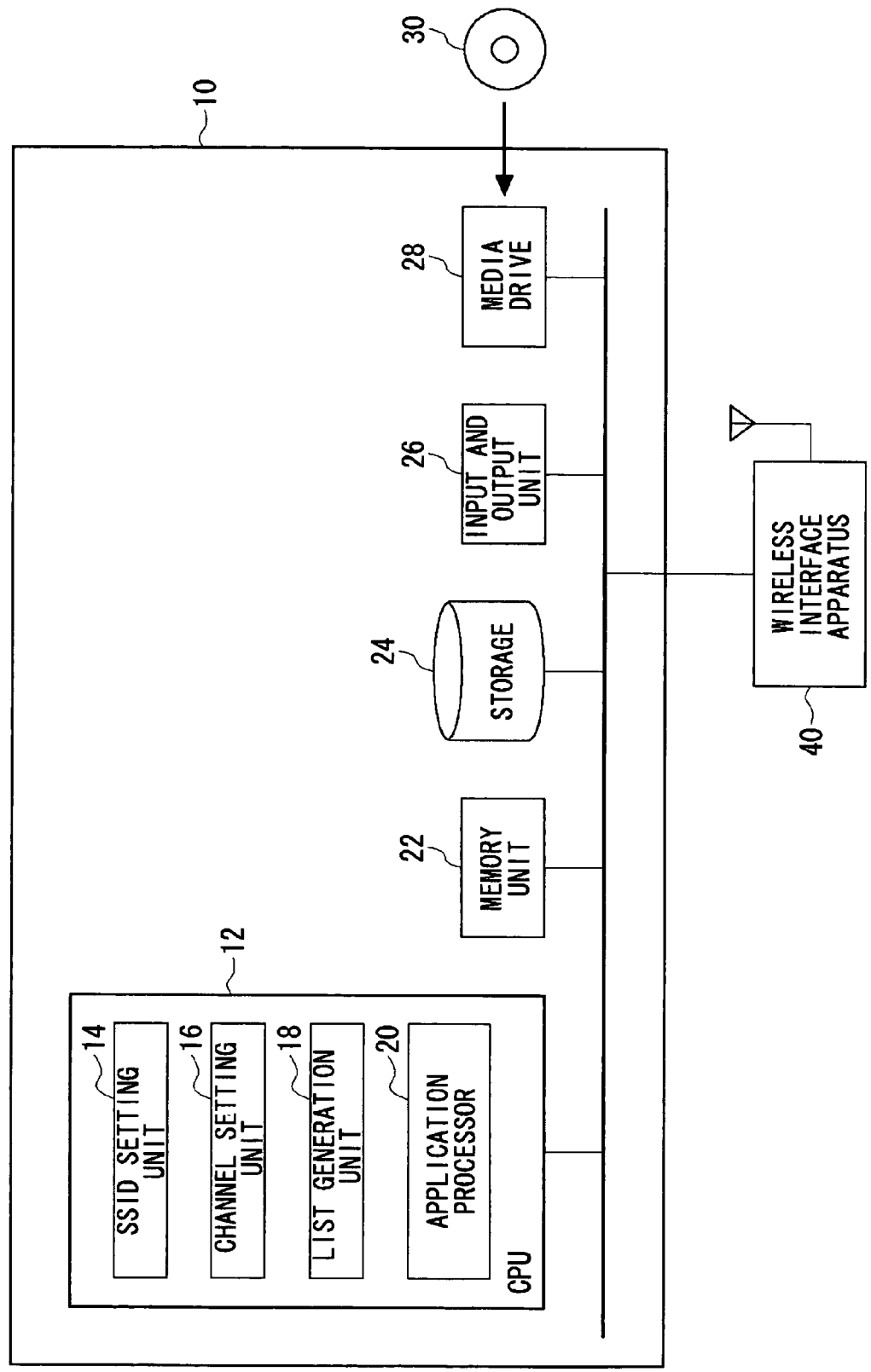
FIG. 13 is a functional block diagram of the game device.

FIG. 13 is a functional block diagram of the game device 2. The game device 2 is formed as a wireless communication terminal and is provided with a processor 10 primarily performing operations related to games and an air interface apparatus 40 performing operations related to communication. The processor 10 and the air interface apparatus 40 are provided as separate hardware. The processor 10 and the air interface apparatus 40 are electrically connected to each other by a bus. The processor 10 is formed as a host PC and is provided with the function of managing the operation of the air interface apparatus 40. The wireless interface apparatus 40 is formed to include a CPU.

Functions for communication in this example are implemented in the processor 10 and the air interface apparatus 40 by a CPU, a memory, a program loaded into the memory and the like. FIG. 13 depicts functional blocks implemented by the cooperation of the elements. The program may be built in the game device 2 or supplied from an external source in the form of a recording medium. Therefore, it will be obvious to those skilled in the art that the functional blocks may be implemented by a variety of manners including hardware only, software only or a combination of both. In the illustrated example, a CPU 12 of the processor 10 is provided with the functions of an SSID setting unit 14, a channel setting unit 16, a list generation unit 18, and an application processor 20. The SSID setting unit 14 sets up an SSID for identifying a network. The channel setting unit 16 sets up a communication channel. The wireless interface apparatus 40 is provided with the function of connecting to a wireless network and the function of exchanging a packet with a game device in the wireless network.

An input and output unit 26 accepts an input from a user and provides an output to the user. More specifically, the unit 26 as an input unit comprises a group of buttons including an arrow key that accept commands from a user for operation. The unit 26 as an output unit is provided with a monitor and speaker. Storage 24 is formed as an external storage device such as a memory stick and is used, for example, to save game data for later retrieval. A disc-shaped recording medium 30 is inserted into a media drive 28 so that a program and data stored in the recording medium 30 are read out. The program and data thus read out are stored in a memory unit 22 and used in processes in the CPU 12. When an application program is downloaded according to example 3, the application program is stored in the memory unit 22 or the storage 24.

As described in example 3, when the power of the game device 2 is turned on and the user selects a download mode, the SSID setting unit 14 sets up the SSID of the DL standby SSID. The channel setting unit 16 sets up a communication channel based on the SSID generated by the SSID setting unit 14. The channel setting function in the channel setting unit 16 is built in all game devices 2 as a common algorithm. Accordingly, the game devices 2 set up the same communication channel based on the same SSID.

For reduction of radio interference between a plurality of IBSSs, the channel setting unit 16 sets the communication channels used in the respective IBSSs so as to be spread over an available frequency band. As an example, the communication channels of the IBSSs may be set up such that the communication channel used in the DL IBSS and the communication channel used in the other IBSSs do not overlap. Since an application program, which is of a relatively large data volume, is transmitted in the DL IBSS, the communication channel of the DL IBSS may suitably be different from the communication channels of the other IBSSs in order to stabilize communication in the DL IBSS.

The communication channel may be set up based on the SSID. For example, the SSID may be subject to an operation using a hash function. A communication channel adapted for the result of operation may be selected from the entire set of communication channels available in IEEE802.11. The type of operation may be optional. By using a predetermined function, the channel setting unit 16 of the game devices 2 is capable of setting up a communication channel such that the communication channels of the respective IBSSs are spread as much as possible. A simple method of operation may be to subject the bit data of the SSID to modulo operation using the number of communication channels. A communication channel may be determined by referring to the remainder of the operation. The communication channels may be numbered and the numbers may be associated with the values of the remainder in relation to each other. With this, the communication channels can be spread over a range prescribed for the environment. The aforementioned operation is implemented by a communication channel setting algorithm common to all game devices 2. Accordingly, the communication channel is uniquely determined in each of the game devices 2 based on the SSID. By setting up a channel for each SSID, radio interference between ad hoc networks is reduced.

The DL standby SSID set up in the SSID setting unit 14 and the communication channel set up by the channel setting unit 16 are transmitted to the wireless interface apparatus 40. The wireless interface apparatus 40 connects to the DL standby IBSS using the communication channel thus set up. With this, the game device 2 can participate in the DL standby IBSS. In the DL standby IBSS, the wireless interface apparatus 40 searches for a game device provided with a downloadable application program. When the wireless interface apparatus 40 receives a terminal information packet from a game device provided with an application program, the list generation unit 18 creates a list that lists the names of downloadable application programs and the terminal information in relation to each other. The wireless interface apparatus 40 allows the list to be displayed on the monitor of the input and output unit 26. When the user viewing the display screen of the monitor selects a game device, the wireless interface apparatus 40 transmits a request for transmission of the application program to the selected game device.

If the wireless interface apparatus 40 receives a reply packet indicating acceptance of the request for transmission, the SSID setting unit 14 sets up the SSID of the DL IBSS. The channel setting unit 16 sets up a communication channel based on the SSID generated by the SSID setting unit 14. The wireless interface apparatus 40 connects to the DL IBSS using the communication channel thus generated. With this, the game device 2 can participate in the DL IBSS to download the application program.

Subsequently, when the application program is started and the user selects a match-up mode, the SSID setting unit 14 sets up the SSID of the lobby IBSS. The channel setting unit 16 sets up a communication channel based on the SSID generated by the SSID setting unit 14. The wireless interface apparatus 40 connects to the lobby IBSS using the communication channel thus set up. With this, the game device 2 can participate in the lobby IBSS and search for an opponent.

In the lobby IBSS, the wireless interface apparatus 40 searches for a game device to execute the application jointly. If the wireless interface apparatus 40 receives a terminal information packet from another game device, the list generation unit 18 creates a list of candidates for match-up and allows the list to be displayed on the monitor of the input and output unit 26. When the user viewing the display screen of the monitor selects a game device, the wireless interface apparatus 40 transmits a request for match-up to the selected game device.

If the wireless interface apparatus 40 receives a reply packet indicating acceptance of the request for match-up, the SSID setting unit 14 sets up the SSID of the game IBSS. The channel setting unit 16 sets up a communication channel based on the SSID generated by the SSID setting unit 14. The wireless interface apparatus 40 connects to the game IBSS using the communication channel thus generated. With this, the game device 2 can participate in the game IBSS.

The application processor 20 executes the game program. An input from a player for operation is transmitted to other game devices within the group via the air interface apparatus 40. Inputs from other game devices within the group are received via the air interface apparatus 40 and processed by the application processor 20.

Thus, the SSID setting unit 14 sets up the SSID for each of the four communication modes including a download standby mode for searching for a game device from which to download, a download mode for executing a download, a lobby mode for searching for an opponent in a game and a game mode for executing the game jointly with the opponent. By setting up the SSID in accordance with the communication mode, communication interference between communication modes is avoided and the convenience of communication modes is enhanced.

When the game device 2 starts a game program, the SSID setting unit 14 may determine whether the SSID set up is stored in a predetermined area in the memory implemented by a flash memory or the like. If the SSID is stored, the SSID setting unit 14 uses the SSID as an identifier of the wireless network to connect to. If the SSID is not stored and if the match-up mode is selected, the SSID setting unit 14 may set up the SSID of the lobby IBSS.

Instead of the SSID setting unit 14, the operating system (OS) provided in the game device 2 may determine whether the SSID is stored in a predetermined area in the memory, when the game device 2 starts an application program. The OS of the game device 2 refers to data stored at a predetermined address in the memory when the application program is started. If the SSID is stored, the OS uses the SSID as an identifier of the wireless network to connect to. The OS of the game device 2 may execute an identifier setting program for performing these processes when the application program is started. The OS of the game device 2 may continue to perform a process for connecting to the wireless network identified by the SSID. The OS of the game device 2 may deliver the SSID to the SSID setting unit 14 after reading out the SSID so that the SSID setting unit 14 may use the SSID as an identifier of the wireless network to connect to.

In case the game device 2 functions as an uploading wireless communication terminal in example 3, the wireless interface apparatus 40 transmits terminal information in the DL standby IBSS. Upon receiving a request for download from another game device, the CPU 12 transmits a reply indicating acceptance or rejection via the wireless interface apparatus 40 in accordance with the user's designation of acceptance or rejection. The SSID setting unit 14 sets up the SSID of the DL IBSS and the channel setting unit 16 sets up a communication channel accordingly. The wireless interface apparatus 40 connects to the DL IBSS using the communication channel thus set up and the CPU 12 uploads the application program via the wireless interface apparatus 40.

Described above is an explanation based on the illustrative example. The example of the invention is only illustrative in nature and it will be obvious to those skilled in the art that variations in constituting elements and processes are possible within the scope of the present invention. In the above example, a description has been given of generation of an IBSS in an ad hoc network. The present invention is not only applicable to an ad hoc network but also to an infrastructure network. In an infrastructure network, a wireless network identifier is efficiently generated to allow a game device to participate in a wireless network, by providing an access point with the function of setting up an SSID.

While the preferred embodiments of the present invention have been described using specific terms, such description is for illustrative purposes only, and it is to be understood that changes and variations may be made without departing from the spirit or scope of the appended claims.

What is claimed is:

1. An application execution method comprising:
    connecting a first wireless communication terminal to a first wireless network in which to search for a second wireless communication terminal with which to execute an application jointly, wherein the first wireless network is formed of a plurality of wireless communication terminals including the first and second wireless communication terminals directly communicating therebetween without using base stations;
    searching by the first wireless communication terminal for the second wireless communication terminal in the first wireless network;
    requesting the second wireless communication terminal from which terminal information is received as a result of the searching to execute the application jointly;
    connecting the first wireless communication terminal to a second wireless network in which to execute the application jointly with the second wireless communication terminal when a reply indicating acceptance is received from the second wireless communication terminal; and
    starting the application jointly in the second wireless network.

2. A non-transitory computer-readable recording medium storing a program causing a computer capable of executing a wireless communication function to execute the functions of:
    connecting a first wireless communication terminal to a first wireless network in which to search for a second wireless communication terminal with which to execute an application jointly, wherein the first wireless network is formed of a plurality of wireless communication terminals including the first and second wireless communication terminals directly communicating therebetween without using base stations;
    searching by the first wireless communication terminal for the second wireless communication terminal in the first wireless network;
    requesting the second wireless communication terminal from which terminal information is received as a result of the searching to execute the application jointly;
    connecting the first wireless communication terminal to a second wireless network in which to execute the application jointly with the second wireless communication terminal when a reply indicating acceptance is received from the second wireless communication terminal; and
    starting the application jointly in the second wireless network.

3. A non-transitory recording medium storing a program that causes a computer capable of executing a wireless communication function to execute the functions of:
    connecting a first wireless communication terminal to a first wireless network in which to search for a second wireless communication terminal with which to execute an application jointly, wherein the first wireless network is formed of a plurality of wireless communication terminals including the first and second wireless communication terminals directly communicating therebetween without using base stations;
    searching by the first wireless communication terminal for the second wireless communication terminal in the first wireless network;
    requesting the second wireless communication terminal from which terminal information is received as a result of the searching to execute the application jointly;
    connecting the first wireless communication terminal to a second wireless network in which to execute the application jointly with the second wireless communication terminal when a reply indicating acceptance is received from the second wireless communication terminal; and
    starting the application jointly in the second wireless network.

\* \* \* \* \*